(12) United States Patent
Sato et al.

(10) Patent No.: US 12,073,678 B2
(45) Date of Patent: Aug. 27, 2024

(54) MODULAR VENDING MACHINE SYSTEM AND MODULAR VENDING MACHINE METHOD

(71) Applicant: FUJI CORPORATION, Chiryu (JP)

(72) Inventors: Takeshi Sato, Nagoya (JP); Akihiro Higashida, Chiryu (JP); Joji Isozumi, Chiryu (JP); Kenta Hagihara, Kasugai (JP)

(73) Assignee: FUJI CORPORATION, Chiryu (JP)

( * ) Notice: Subject to any disclaimer, the term of this patent is extended or adjusted under 35 U.S.C. 154(b) by 530 days.

(21) Appl. No.: 17/421,828

(22) PCT Filed: Jan. 12, 2019

(86) PCT No.: PCT/US2019/013390
§ 371 (c)(1),
(2) Date: Jul. 9, 2021

(87) PCT Pub. No.: WO2020/145992
PCT Pub. Date: Jul. 16, 2020

(65) Prior Publication Data
US 2022/0101678 A1 Mar. 31, 2022

(51) Int. Cl.
*G07F 11/10* (2006.01)
*G05B 15/02* (2006.01)

(52) U.S. Cl.
CPC ............ *G07F 11/10* (2013.01); *G05B 15/02* (2013.01)

(58) Field of Classification Search
CPC .................................................... G07F 11/10
See application file for complete search history.

(56) References Cited

U.S. PATENT DOCUMENTS

| | | | |
|---|---|---|---|
| 6,006,946 A * | 12/1999 | Williams | G07F 17/0092 221/9 |
| 2005/0224510 A1 * | 10/2005 | Remis | B65B 5/103 221/69 |
| 2006/0058724 A1 * | 3/2006 | Handfield | G07F 9/026 221/9 |
| 2006/0293784 A1 | 12/2006 | Braunstein | |

(Continued)

OTHER PUBLICATIONS

International Search Report and Written Opinion issued on Mar. 14, 2019 in PCT/US2019/013390 filed on Jan. 12, 2019.

*Primary Examiner* — Gene O Crawford
*Assistant Examiner* — Ayodeji T Ojofeitimi
(74) *Attorney, Agent, or Firm* — Oblon, McClelland, Maier & Neustadt, L.L.P.

(57) ABSTRACT

A modular vending machine system including: multiple cartridges configured to hold a good to be dispensed; a docking station configured to removably store at least one of the cartridges; a vending machine main body including a cartridge port configured to receive at least one of the cartridges, a dispensing-port for dispensing the good to a user, and a mechanism configured to perform at least one of removing the good from the cartridge, performing dispensing preparation processing of the good, or dispensing the good via the dispensing port; and control circuitry configured to control operation of the cartridges, the docking station, and the vending machine, wherein the cartridge is provided with a traveling mechanism configured to enable the cartridge to move to and from the docking station and the vending machine main body.

8 Claims, 9 Drawing Sheets

(56) References Cited

U.S. PATENT DOCUMENTS

2008/0109110 A1\* 5/2008 Walker .................. G06Q 30/02
    700/232
2008/0264967 A1\* 10/2008 Schifman ............ G07F 17/0092
    221/133
2012/0006204 A1 1/2012 Eidenschink et al.

\* cited by examiner 905 90 901

Cartridge information

| Cartridge ID | Current position | Good name | Current quantity | Factory loading date | 1st dispensing date | 2nd dispensing date | 3rd dispensing date | 4th dispensing date | ... |
|---|---|---|---|---|---|---|---|---|---|
| 1 | Machine A | ***** | 80 | dd/mm/yy | dd/mm/yy | dd/mm/yy | dd/mm/yy | dd/mm/yy | ... |
| 2 | Station X | ***** | 100 | dd/mm/yy | dd/mm/yy | dd/mm/yy | dd/mm/yy | dd/mm/yy | ... |
| 3 | Station X | ***** | 100 | dd/mm/yy | dd/mm/yy | dd/mm/yy | dd/mm/yy | dd/mm/yy | ... |
| 4 | Station X | ***** | 0 | dd/mm/yy | dd/mm/yy | dd/mm/yy | dd/mm/yy | dd/mm/yy | ... |
| 5 | Truck P | ***** | 100 | dd/mm/yy | dd/mm/yy | dd/mm/yy | dd/mm/yy | dd/mm/yy | ... |
| 6 | Factory F | ***** | 100 | dd/mm/yy | dd/mm/yy | dd/mm/yy | dd/mm/yy | dd/mm/yy | ... |
| ... | ... | ... | ... | ... | ... | ... | ... | ... | |

902
904

Vending machine information

| Machine ID | Location | Good name | Vending machine quantity | Docking station quantity | Expected empty date |
|---|---|---|---|---|---|
| A | Office | ***** | 80 | 300 | dd/mm/yy |
| B | Park | ***** | 40 | 0 | dd/mm/yy |
| C | Train station | ***** | 100 | 100 | dd/mm/yy |
| ... | ... | ... | ... | ... | ... |

903

Allowed cartridge list

| Cartridge ID | Good name | Current quantity | Factory loading date |
|---|---|---|---|
| 1 | ***** | 100 | dd/mm/yy |
| 2 | ***** | 100 | dd/mm/yy |
| 3 | ***** | 100 | dd/mm/yy |
| 4 | ***** | 100 | dd/mm/yy |
| 5 | ***** | 100 | dd/mm/yy |
| 6 | ***** | 100 | dd/mm/yy |
| ... | ... | ... | ... |

*Fig.4*

MODULAR VENDING MACHINE SYSTEM AND MODULAR VENDING MACHINE METHOD

FIELD OF THE DISCLOSURE

The present application relates to a modular vending machine system and a modular vending machine method.

DESCRIPTION OF THE RELATED ART

Vending machines are ubiquitous in the modern world, dispensing all manner of goods to grateful users simply by them inserting money and selecting a desired item. Modern vending machines are reliable, convenient, and available with various functions. For example, there are models that dispense packaged goods such as ready-made food, beverages, printed materials, clothing, and so on. There are also models capable of preparing and dispensing more complex goods such as drinks made from a mixture of ingredients and even hot meals.

Among the advances in vending machine technology are those disclosed in, for example, US Patent Application Publication 2006 0293784 A1 ("US '784") and US Patent Application Publication 2012 0006204 A1 ("US '204").

US '784 discloses an automatic distributed vending system consisting of automatic vending modules. The modules have a conveyor with linked carriers and a mechanism and control system for automatic loading and unloading of an item out of a carrier upon request. Also disclosed is a controller consisting of a processor, sensors, control devices for moving conveyors and other mechanisms, carrier and content identification barcode scanners, human-machine interfaces, status indicators, serial interfaces within the modules and to a system local area network. The controller maintains in real-time inventory and the status of all carriers and their content. Modules have outer enclosure with one side accessible by a provider, and another side accessible by a user, with loading of content into carriers being performed semi-automatically or automatically. Such operation is performed by the controller based on reading of barcodes. Modules may have different carriers inside, attached to the same conveyor, and may be recognized by means of barcode labels. The controller identifies each carrier by reading the barcode information, and deposits appropriate content into each carrier.

US '204 discloses a refillable vend module including at least one canister configured to contain an ingredient for a beverage, and a connecting mechanism configured to slidably connect to any one of a plurality of modular vend spaces in a vending machine. At least one canister comprises a poka-yoke refill connection configured to couple an ingredient cartridge to the canister, where the poka-yoke refill connection matches a type of the canister to a type of the ingredient cartridge. The vending machine includes a plurality of modular vend spaces and a plurality of refillable vend modules.

However, with conventional technology such as that disclosed in the examples above, work of restocking vending machines has numerous disadvantages in terms of security, speed, waste materials, and efficiency. Thus, there remains room for improvement in the field of vending machine systems, especially with respect to work of restocking a vending machine.

SUMMARY

From the above, we can see that it is desirable to have a modular vending machine system that improves upon existing arrangements for restocking a vending machine. For this, the inventors propose a modular vending machine system including multiple cartridges configured to hold a good to be dispensed; a docking station configured to removably store at least one of the cartridges; a vending machine main body including a cartridge port configured to receive at least one of the cartridges, a dispensing-port for dispensing the good to a user, and a mechanism configured to perform at least one of removing the good from the cartridge, performing dispensing preparation processing of the good, or dispensing the good via the dispensing port; and control circuitry configured to control operation of the cartridges, the docking station, and the vending machine main body. The cartridge is provided with a traveling mechanism to enable the cartridge to move to and from the docking station and the vending machine main body.

With the modular vending machine system above, because the system is provided with multiple cartridges configured to hold a good to be dispensed; a docking station configured to removably store at least one of the cartridges; a vending machine main body including a cartridge port configured to receive at least one of the cartridges, a dispensing-port for dispensing the good to a user, and a robot configured to perform at least one of removing the good from the cartridge, performing dispensing preparation processing of the good, or dispensing the good via the dispensing port; and control circuitry configured to control operation of the cartridges, the docking station, and the vending machine, and, in particular, because the cartridge is provided with a traveling mechanism configured to enable the cartridge to move to and from the docking station and the vending machine main body, work of restocking the vending machine main body with goods is performed more efficiently and securely. For example, when goods have been depleted in a first cartridge set in the cartridge port of the vending machine main body, the traveling mechanism of the first cartridge enables the first cartridge to move from the vending machine main body to the docking station. Also, the traveling mechanism of a second cartridge that is fully stocked with goods enables the second cartridge to move from the docking station to the vending machine main body. In this way, the vending machine main body is restocked with goods in a highly efficient and secure manner.

A modular vending machine method of the present disclosure includes: loading a good to be dispensed into a cartridge that is one of multiple cartridges configured to hold the good, the cartridges being provided with a traveling mechanism; removably storing at least one of the cartridges at a docking station configured to removably store at least one of the cartridges; receiving at least one of the cartridges into a cartridge port of a vending machine main body, the vending machine main body also including a dispensing-port for dispensing the good to a user and a mechanism configured to perform at least one of removing the good from the cartridge, performing dispensing preparation processing of the good, or dispensing the good via the dispensing port; controlling operation of the cartridges, the docking station, and the vending machine using control circuitry; and moving the cartridge to move to and from the docking station and the vending machine main body using the traveling mechanism.

The above method has similar benefits to the modular vending machine system above.

BRIEF DESCRIPTION OF THE SEVERAL VIEWS OF THE DRAWINGS

FIG. 4 shows an example of vending information, according to certain aspects of the disclosure.

DETAILED DESCRIPTION

Figure 1:
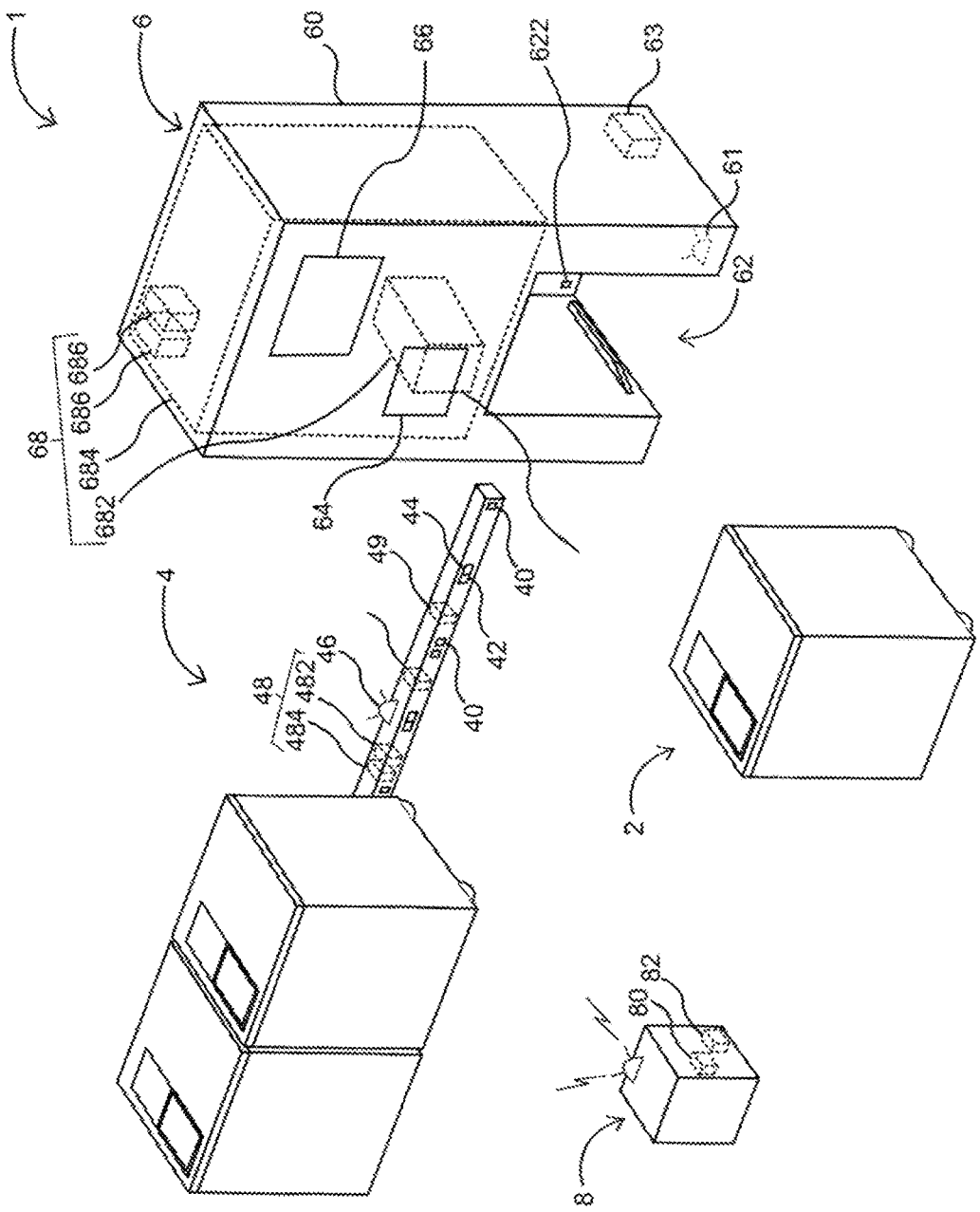
FIG. 1 is an overall view of a modular vending machine system, according to certain aspects of the disclosure.

Materials, methods, and examples discussed herein are illustrative only and are not intended to be limiting. In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise.

Figure 2:
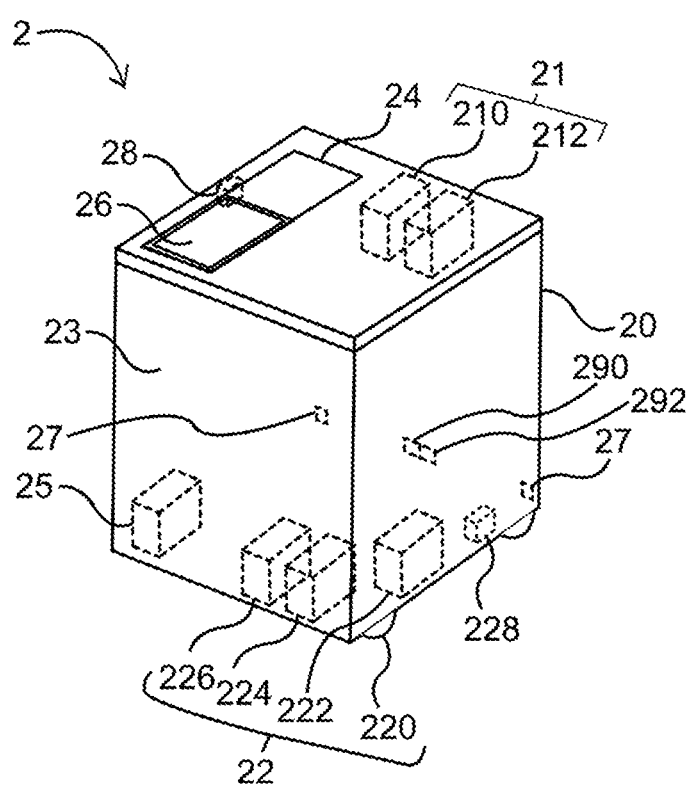
FIG. 2 shows a cartridge of the modular vending machine system, according to certain aspects of the disclosure.

The basic physical configuration of the main items of a modular vending machine system is described first with reference to FIGS. 1 and 2. FIG. 1 is an overall view of a modular vending machine system, according to certain aspects of the disclosure. Modular vending machine system 1 includes: cartridge 2 configured to hold a good to be dispensed; docking station 4 configured to removably store multiple of the cartridges 2; vending machine main body 6; and control circuitry 8 configured to control operation of cartridges 2, docking station 4, and vending machine main body 6.

Vending machine main body 6 includes: reading and communication device (ID reader) 61 for reading IDs of cartridges 2, communicating with other units, and the like; cartridge port 62 configured to receive and clamp a cartridge 2; vending control circuitry 63 for controlling vending operations; dispensing-port 64 for dispensing a good to a user; user interface 66 for receiving money and instructions from a user and the like; and robot (mechanism, shutter opening mechanism) 68 configured to remove a good from cartridge 2 loaded in cartridge port 62, perform dispensing preparation processing of the good, and dispense the good via dispensing port 64.

Docking station 4 includes: multiple clampers 40 for each clamping a cartridge 2; power and communication connection 42 for supplying power to clamped (docked) cartridges 2; amenities supply 44 for supplying amenities such as hot and cold water or a gas (for example, air) to docked cartridges 2; reading and communication device (ID reader) 46 for reading IDs of cartridges 2, communicating with other units, and the like; temperature controller 48 for controlling the temperature inside cartridges 2; and advertising controller 49.

Control circuitry 8 that controls operation of cartridges 2, docking station 4, and vending machine main body 6 includes: memory 80 for memorizing information such as locations of modular vending machine system 1, positions of cartridges 2, stock levels of goods, types of goods, required storage conditions of goods, dispensing preparation processing for goods, and the like; and calculating section 82 for performing processing such as calculating stock levels of goods, expected empty dates, delivery routes, delivery schedules, optimal replenishment timing, and the like.

As shown in FIG. 2, each cartridge 2 has a modular configuration including: body 20; temperature controller 21 for controlling the temperature of goods inside the cartridge; travelling mechanism 22 for enabling cartridge to travel to and from docking station 4 and vending machine main body 6; advertising surface 23 used display an advertisement or the like; supply port 24 for supplying goods to robot 68 of vending machine main body 6; shutter 26 for opening and closing supply port 24; cartridge memory section 25 for memorizing items such as the ID of the cartridge (cartridge identification information), the type of goods loaded, and the remaining quantity of goods; clamper receiving section 27 for being clamped; lock 28 for locking shutter 26; power and communication receiving connection 290 for receiving power and communication; and amenities receiving connection 292 for receiving amenities. Travelling mechanism 22 includes: wheels 220; motor (actuator) 222 for driving wheels 220; locating device 224 for providing location information to control circuitry 8; traveling control section 226 for controlling traveling of cartridge 2; and ID recording section 228 for recording identification information (cartridge ID) of the cartridge 2.

Shutter 26 is a lockable shutter movable between a closed state in which the good cannot be accessed from outside the cartridge 2 and an open state in which the good can be removed from the cartridge 2. Lock 28 is configured to only allow shutter 26 to be moved to the open state when cartridge 2 is suitably set in vending machine main body 6 and when cartridge 2 is to be loaded with goods in factory 3 (refer to FIG. 3). Details regarding operation of lock 28 and shutter 26 are described later.

Cartridge 2 may be configured to hold goods directly without the need for intermediate packaging. In this manner, waste materials and the like are reduced. Obviously, the exact configuration of the inside of cartridge 2 will depend on the types of goods to be dispensed, but may include fixed or movable shelves, boxes, racks, or the like. Cartridge 2 may also be provided with a battery or the like as required for supplying power to any electrical items or the like that require power even when cartridge 2 is not docked at a docking station or loaded in a vending machine main body.

Figure 3:
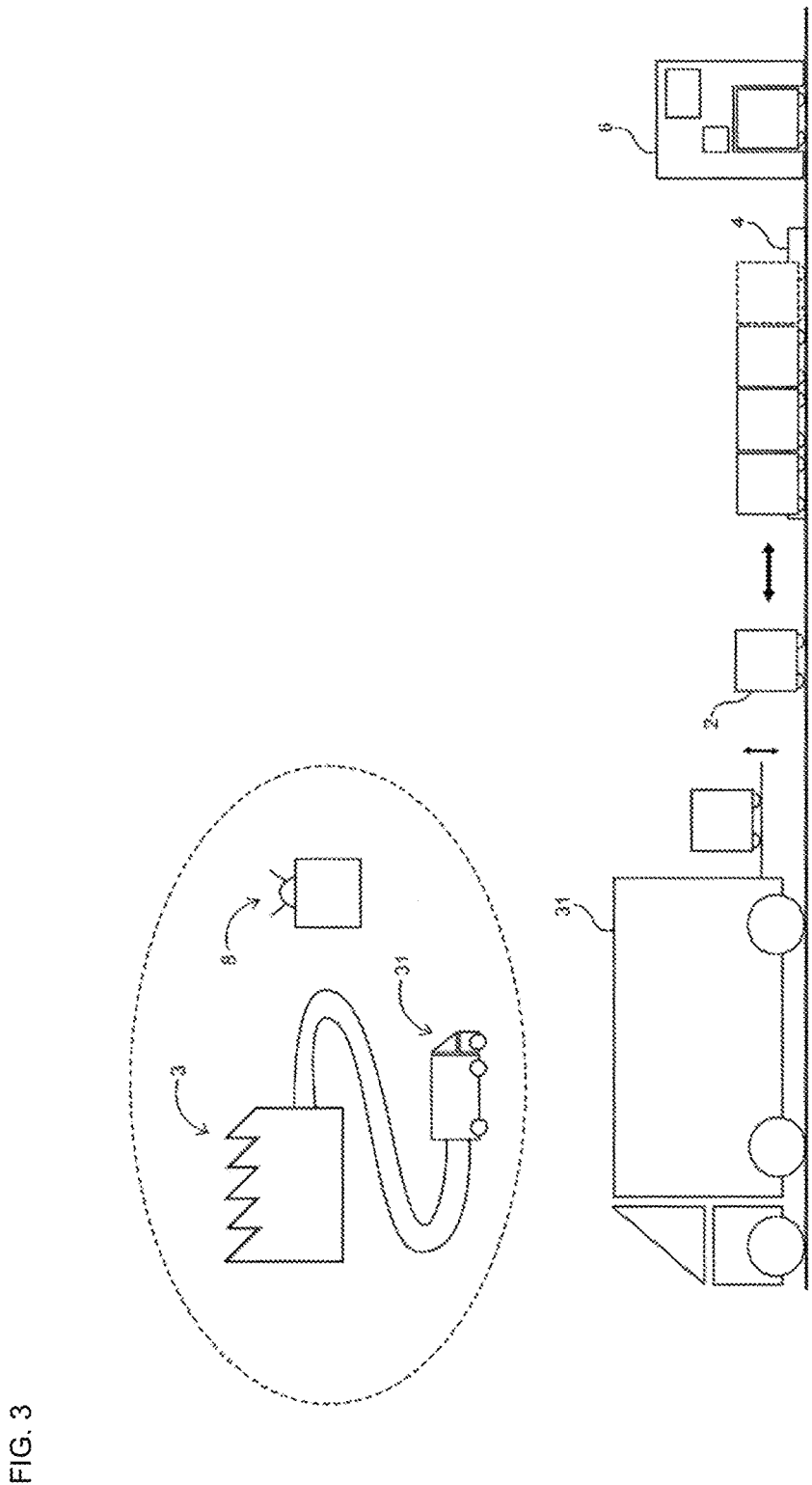
FIG. 3 is a schematic view of supply and delivery using the modular vending machine system, according to certain aspects of the disclosure.

Basic operation of modular vending machine system 1 will now be described. FIG. 3 shows modular vending machine system 1 in terms of an entire supply chain. Factory 3 is where the goods to be dispensed are manufactured, packaged, prepared, and loaded into cartridges 2. Goods to be dispensed are not particularly limited and include items typically dispensed by a vending machine such as: food, beverages, printed materials, clothing, and so on. Descriptions are given of a modular vending machine system particularly suited to the dispensing of beverages or food. In the case of beverages, users typically demand certain temperatures for the delicious consumption of such beverages, so appropriate temperature control of the beverages is required. Also, there may be cases in which users demand, for example, that a beverage be served cold in the summer, but hot in the summer. In the case of food, modular vending machine system 1 is particular suited to dispensing, for example, a meal with main ingredients of noodles and hot water, rice and curry, fried rice, or the like.

Cartridges 2 loaded with goods from factory 3 are loaded onto delivery truck 31 to be transported to sales sites (locations) at which units of modular vending machine system 1 are located. The types and quantities of goods in cartridges 2 dispatched from factory 3 on delivery truck 31 may be decided based on information such as current stock levels of the modular vending machine system 1 to which goods are to be delivered and expected depletion rates based on past sales. Memory 80 of control circuitry 8 memorizes vending information 90 such as locations, quantities of goods, types of goods, required storage conditions, dispensing preparation processing, and the like (refer to FIG. 4 and later descriptions for detailed contents and usage examples of vending information 90). Based on vending information 90, calculating section 82 of control circuitry 8 performs processing such as calculating quantities of goods, expected empty dates, delivery routes, delivery schedules, optimal replenishment timing, and the like. Control circuitry 8 then issues instructions such that appropriate types and quantities of goods are loaded onto truck 31 and such that truck 31 follows an appropriate delivery route. Depending on the level of automation in factory 3 and of truck 31, this entire process may be performed automatically, or instructions may be issued to human operators to perform actions that are not fully automated. Truck 31 may be, for example, a conventional truck driven by a human driver, or an automated guided vehicle (AGV) that can autonomously follow delivery route instructions.

Control circuitry 8 is shown schematically in FIGS. 1 and 3 as a separate unit, such as a computer configured from items such as a CPU, memory, input-output interface, and the like, and linked to each unit in modular vending machine system 1 via a network. With control circuitry 8 communication may be performed wirelessly, or via wired connections. Control circuitry 8 may be configured as part of units of modular vending machine system 1 such as vending machine main body 6, docking station 4, or cartridges 2. Alternatively, control circuitry 8 may be divided such that a portion of each of the functions of control circuitry 8 are performed in different units.

As illustrated in FIG. 3, once delivery truck 31 arrives at the location at which goods are to be dispensed, control circuitry 8 issues instructions for a cartridge 2 loaded with appropriate goods to be unloaded and moved to docking station 4. Control circuitry 8 may also issue instructions such that any empty or used cartridges 2 docked at docking station 4 travel to delivery truck 31 to be taken back to factory 3 for restocking, recycling, or the like. Loading and unloading of cartridges 2 to and from delivery truck 31 may be performed fully automatically, with a loading and unloading device of delivery truck 31 being controlled based on instructions from control circuitry 8, or may be performed by issuing instructions to a human operator to assist with actions that are not fully automated.

Once cartridge 2 is within a suitable range of docking station 4 and vending machine main body 6, based on instructions from control circuitry 8, via control by traveling control section 226, traveling mechanism 22 operates such that cartridge 2 travels to a position in front of an empty space at docking station 4 (details of this processing are described later). Next, via control by traveling control section 226, traveling mechanism 22 operates such that cartridge 2 is aligned with clamper 40 on docking station 4, then cartridge 2 is moved towards docking station 4 until it is in position to be clamped. Clamper 40 of docking station then activates to clamp cartridge 2 in position by clamping clamper receiving section 27 of cartridge 2. Movement of cartridge 2 may be performed based on exchange of position information between locating device 224 of cartridge 2 and reading and communication device (ID reader) 46 of docking station 4. Locating device 224 may be a unit that uses known positioning technology, such as GPS for obtaining positioning information. Alternatively, locating device 224 may use a camera and image processing unit to recognize positional markers such as ArUco codes to obtain positioning information. Guides rails or the like may also be provided on at least one of cartridge 2 or docking station 4 such that once rough positioning of cartridge 2 with respect to docking station 4 has been performed, final positioning may be achieved by cartridge 2 moving while being guided by the guide rails.

By clamping cartridge 2 in docking station 4, power can be supplied from docking station 4 to cartridge 2 by power and communication connection 42 of docking station 4 being connected to power and communication receiving connection 290 of cartridge 2. Amenities such as hot and cold water or a gas (for example, air) may also be supplied by amenities supply 44 of docking station 4 being connected to amenities receiving connection 292 of cartridge 2. This enables cartridge 2 to keep goods to be dispensed in an optimal state for user consumption without the need for cartridge 2 to be equipped with a long-term power supply unit. The ID of cartridge 2 is acquired from ID recording section 228 and by checking information linked to the ID, docking station 4 is able to maintain cartridge 2 in an optimal state for the goods loaded inside cartridge. For example, for goods that need to be kept cold, cooling section 484 (refer to FIG. 1) of docking station 4 provides a cooling agent such as cold water or a gas (for example, air) that acts to refrigerate the inside of cartridge 2. On the other hand, for goods that need to be kept warm or hot, heating section 482 (refer to FIG. 1) provides a heating agent such as hot water or a gas (for example, air) that warms the inside of cartridge 2. Changing between the supply of a cooling agent or a heating agent may be performed by a switching mechanism (not shown) such as a solenoid valve. Note that, details regarding processing for the verifying of the ID of cartridge 2 by docking station 4 are described later.

Cartridge 2 is also provided with temperature controller 21 including heating section 210 and cooling section 212 (refer to FIG. 2). Temperature controller 21 uses these sections to control the temperature of goods inside cartridge 2 while cartridge is not docked at docking station 4 or loaded in vending machine main body 6. Heating section 210 and cooling section 212 may be equipped with active means for changing the temperature inside cartridge 2, or may use passive means that act to maintain a temperature for as long as possible until cartridge 2 is docked at docking station 4 or set in vending machine main body 6.

While cartridge 2 is docked at docking station 4, advertising controller 49 may control advertising surface 23 of cartridge 2 to display, for example, advertisements for the goods to be dispensed by modular vending machine system 1, or advertisements unrelated to the goods to be dispensed. Depending on how many cartridges are docked at docking station 4, multiple advertising surfaces 23 may be combined to form a single image. That is, each advertising surface 23 of multiple cartridges 2 may display a portion of the advertisement. In this manner, effective and efficient promotion of the goods to be dispensed is performed at all times. The configuration of advertising surface 23 is not particularly limited and may be, for example, an LCD or LED display device.

When goods to be dispensed run out at vending machine main body 6, control circuitry 8 issues instructions for the cartridge 2 currently loaded in cartridge port 62 to move from vending machine main body 6 to docking station 4. Based on the instructions, travelling mechanism 22 of cartridge 2 operates to move the cartridge 2 from cartridge port 62 of vending machine main body 6 to docking station 4. The empty (used) cartridge then docks at docking station 4 as described above and waits until a delivery truck 31 arrives to take the empty cartridge 2 back to factory 3.

Next, control circuitry 8 issues instructions such that a cartridge 2 holding appropriate goods moves from docking station 4 to cartridge port 62 of vending machine main body 6. In detail, docking station 4 unclamps the cartridge 2 by reversing the clamping procedure described above (including disconnecting the power supply, the amenities and the like). Then, based on instructions from control circuitry 8, cartridge 2 travels to a position in front of cartridge port 62 of vending machine main body 6. Traveling mechanism 22 operates such that cartridge 2 is aligned with cartridge port 62, then cartridge 2 is moved into cartridge port 62 until it is in position to be clamped. Clamper 622 of vending machine main body 6 then activates to clamp cartridge 2 in position by clamping clamper receiving section 27 of cartridge 2. Loading of cartridge 2 may be performed by exchange of position information between locating device 224 of cartridge 2 and reading and communication device 61 of vending machine main body 6. As with docking station 4, guides rails or the like may also be provided on at least one of cartridge 2 or cartridge port 62 such that once rough positioning of cartridge 2 with respect to cartridge port 62 has been performed, final positioning may be achieved by cartridge 2 moving while being guided by the guide rails.

Once clamped in cartridge port 62, cartridge 2 is provided with power and amenities from vending machine main body 6 (items such as a power supply port are not shown in the figures). Similar to when cartridge 2 is docked at docking station 4, the ID of cartridge 2 is acquired from ID recording section 228 and by checking information linked to the cartridge ID, vending machine main body 6 is able to maintain cartridge 2 in an optimal state for the goods loaded inside cartridge. Details regarding processing for the verifying of the ID of cartridge 2 by vending machine main body 6 are described later.

Until this point, shutter 26 of cartridge 2 has been positioned such that supply port 24 of cartridge 2 is closed, with lock 28 activated such that shutter 26 cannot move. In this manner, it is not possible for someone to steal the goods from cartridge 2 or for any foreign matter to be inserted into cartridge 2, which is desirable from a security point of view. Then, with the cartridge 2 loaded in cartridge port 62 of vending machine main body 6, the system remains in standby until a user wants to dispense a good.

A user wishing to dispense a good pays and selects a desired good at user interface 66 of vending machine main body 6. Based on the selected good, vending control circuitry 63 controls robot 68 of vending machine main body 6 such that the selected good is dispensed via dispensing port 64 of vending machine main body 6. In detail, first, lock 28 of cartridge 2 is deactivated such that shutter 26 can move. Lock 28 may be a mechanical lock that is operated via a mechanical device in vending machine main body 6, or an electronic lock that is operated via signals sent from vending machine main body 6, control circuitry 8, or the like. Next, motors 686 (refer to FIG. 1) of drive shutter opening and closing arm (shutting opening mechanism) 682 (refer to FIG. 1) of robot 68 to move shutter 26 of cartridge 2 from a closed position to an open position. Then, vending control circuitry 63 controls goods handling device 684 (refer to FIG. 1) to remove the selected good from cartridge 2, perform dispensing preparation processing of the good, and dispense the good via dispensing port 64. In the case of a simple good such as a canned beverage, dispensing preparation processing may simply be orienting the good in the correct orientation to be dispensed to a user via dispending port 64. Alternatively, for a more complex good such as a meal with main ingredients of noodles and hot water, preparation processing may include cutting, mixing, heating ingredients, and the like, so as to prepare a fresh meal as selected by the user. In each case, the final step is to dispense the good via dispensing port 64.

The above processing is repeated each time a user selects a good until all the goods in cartridge 2 have been dispensed. The quantity of goods loaded in cartridge 2 may be stored on cartridge memory 25, updated each time a good is dispensed, and sent to control circuitry 8. Alternatively, the quantity of goods may be stored on memory (not shown) provided in vending machine main body 6, updated each time a good is dispensed, and sent to control circuitry 8. Or, the quantity of goods may be managed entirely by control circuitry 8, with the quantity of goods memorized on memory 80 and updated based on the number of times that dispensing operation is performed by vending machine main body 6. Then, based on the information regarding the quantity of goods in cartridge 2, when control circuitry 8 determines that the cartridge 2 is empty, control circuitry 8 issues instructions for the cartridge 2 to move from vending machine main body 6 to docking station 4. Movement of cartridge 2 from vending machine main body 6 to docking station 4 is performed in a similar manner to descriptions of cartridge 2 moving from docking station 4 to vending machine main body 6.

When the used cartridge 2 has moved out of cartridge port 62, control circuitry 8 issues instructions such that a cartridge 2 loaded with goods moves from docking station 4 to vending machine main body 6. Movement of cartridges 2 may be performed along a pre-determined pathway that can be marked out to warn passersby that units such as cartridge 2 are operating in the area. Also, cartridges 2 may move sequentially (that is, a used cartridge 2 may move from vending machine main body 6 to docking station 4, then a full cartridge 2 may move from docking station 4 to vending machine main body 6) such that only a small area is occupied by moving cartridges 2. Alternatively, cartridges 2 may move simultaneously to reduce the time required to replenish goods at vending machine main body 6 (that is, the full cartridge 2 may start moving from docking station 4 to vending machine main body 6 while the used cartridge 2 is moving from vending machine main body 6 to docking station 4).

Further, cartridges 2 may also be configured to travel together in a single group. For example, multiple cartridges 2 could be physically linked by joining brackets (not shown) and then the group of joined cartridges 2 could be controlled based on the position of the first cartridge 2 in the group. Alternatively, the relative positions of the multiple cartridges 2 in the group could be maintained without a physical link by coordinates the positions via communication of positions. In this manner, cartridges 2 move efficiently to and from docking station 4 and truck 31.

In descriptions above, the positions of cartridges 2 during movement may be determined based on use of known technology, for example, GPS or ArUco markers recognized by a camera and image processing. Modular vending machine system 1 may also be provided with suitable monitoring and safety devices (not shown) for confirming that no obstacles or people are in the vicinity before cartridges 2 start to move. Similarly, the system may be configured to stop cartridges 2 if an obstacle or person enters the vicinity while cartridges 2 are moving. Modular vending machine system 1 may also be configured to issue warnings in the form of audio or visual displays such that nearby people are alerted to the fact that cartridges 2 are moving or about to start moving.

Next, operation of modular vending machine system 1 is described in more detail with respect to processing that occurs during restocking. In particular, processing of verifying that a cartridge 2 with correct goods is loaded is described.

FIG. 4 shows an example of vending information 90 memorized by control circuitry 8. Vending information 90 includes location information of the vending machine main body, current position information of each of the multiple cartridges, good information of the type of the good held by each of the multiple cartridges, current quantity information that is the current quantity of the goods held by each of the cartridges, factory loading date information that is a date on which goods were loaded into each of the cartridges, dispensing date information that is a date on which each of the goods in each of the cartridges were dispensed, vending machine quantity information that is information on a current quantity of the goods in the vending machine main body, docking station quantity information that is information on a current quantity of the goods in the cartridges docked at the docking station.

When a cartridge 2 is loaded with goods at factory 3 (refer to FIG. 3), vending information corresponding to that cartridge 2 is entered into control circuitry 8 by an operator or the like. For example, as shown in FIG. 4, for each cartridge 2, cartridge information 901 is entered. Cartridge information 901 includes cartridge ID 905 (cartridge identification information) that is a unique identification number for the cartridge, current position information (information of the current position of the cartridge), good name (the type of the good held by the cartridge), current quantity (the current quantity of the goods held by the cartridge), and factory loading date (the date on which goods were loaded into the cartridge). Cartridge information 901 may also include information such as the type of supply packaging used for the good (such as cup or can). Also, at factory 3, a unique key (such as a digital key, not shown) for unlocking lock 28 of shutter 26 of cartridge 2 is set.

Control circuitry 8 also memorizes vending machine information 902 related to a vending machine main body 6 and docking station 4. Vending machine information 902 includes a machine ID that is a unique identification number of a vending machine main body 6, location (the location of the vending machine main body 6 and corresponding docking station 4), good name (name of the good or goods dispensed at that location), vending machine quantity (quantity of the goods in that vending machine main body 6), docking station quantity (quantity of the goods in that docking station 4), and expected empty date 904 (when the vending machine main body 6 and docking station 4 are expected to run out of goods). Details of how expected empty date 904 is calculated are described later.

Control circuitry 8 also memorizes allowed cartridge list 903 that specifies a list of cartridges 2 from which goods are allowed to be dispensed from a given modular vending machine system 1 (vending machine main body 6).

Verification processing performed by modular vending machine system 1 using the above information will be described with reference to FIGS. 5 to 7.

Figure 5:
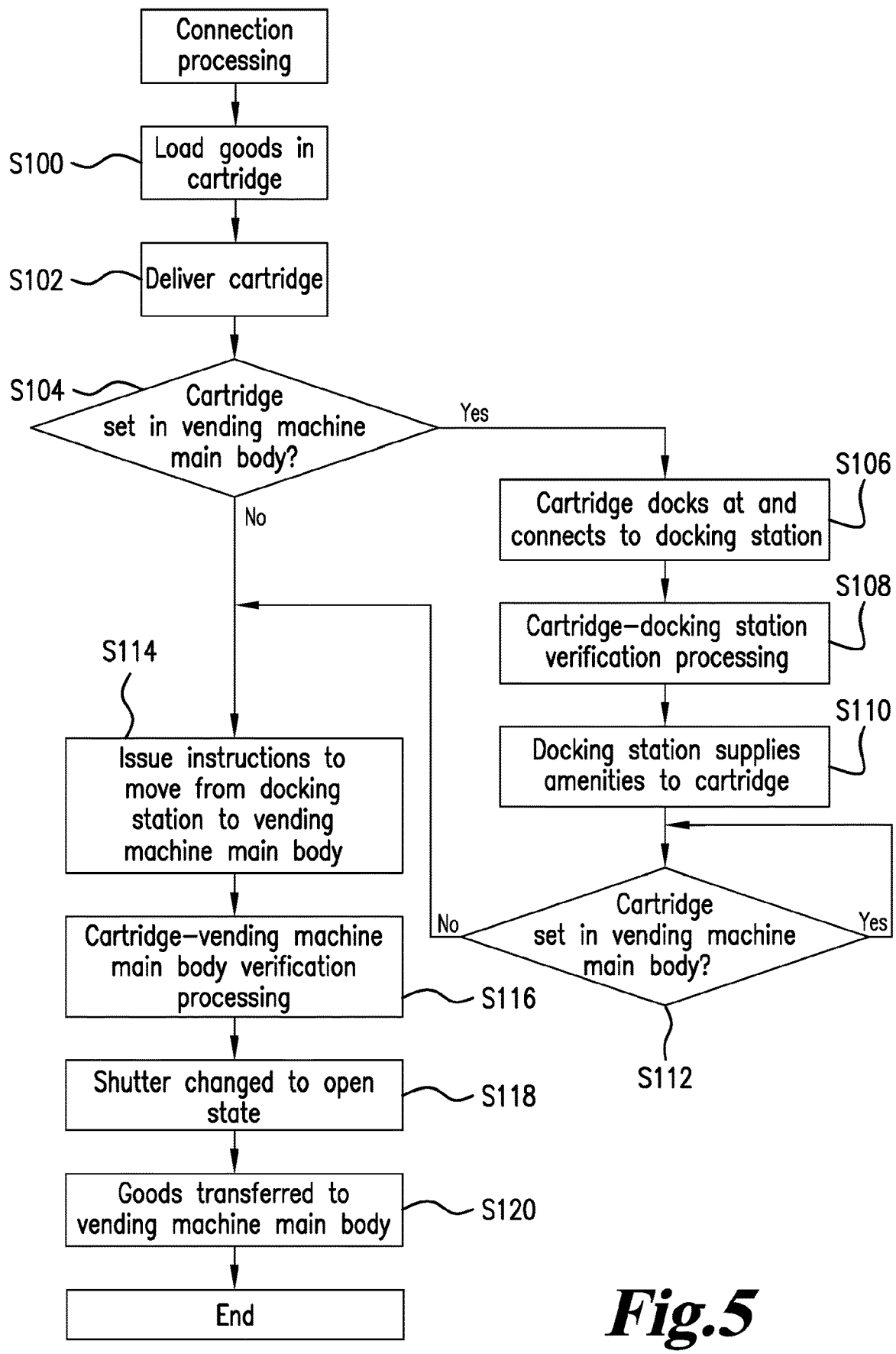
FIG. 5 shows an example of connection processing between a cartridge and a docking station and a cartridge and a vending machine main body, according to certain aspects of the disclosure.

FIG. 5 shows an example of connection processing between cartridge 2 and docking station 4, and between cartridge 2 and vending machine main body 6. This processing is performed when cartridge 2 loaded with goods is delivered from factory 3 to docking station 4 or vending machine main body 6.

First, in S100, cartridge 2 is loaded with goods (for example, at factory 3) to be dispensed at vending machine main body 6 which is set a given location (such as an office, park, train station, or the like). Next, in S102, cartridge 2 is delivered within a range at which communication is possible with docking station 4 and vending machine main body 6. Then, in S104, control circuitry 8 performs communication to check whether there is a cartridge 2 set in vending machine main body 6. If there is a cartridge 2 set in vending machine main body 6, processing proceeds to S106, where cartridge 2 docks at docking station 4 (refer to descriptions above) and connects to docking station 4. Next, in S108, cartridge-docking station verification processing is performed to verify that a suitable cartridge 2 is connected and to acquire information such as the good name and storage conditions (not shown) suitable for that good (such as storage temperature and the like). For details of cartridge-docking station verification processing, refer to FIG. 6.

When cartridge-docking station verification processing is complete, in S110, based on the information acquired in S108, docking station 4 supplies suitable amenities to cartridge 2 such that the goods inside cartridge 2 are maintained in a good condition. Then, in S112, control circuitry 8 checks whether a cartridge 2 is set in vending machine main body 6. If the answer is "yes", processing of S112 is repeated.

When the answer is "no" in S112, processing proceeds to S114 and control circuitry 8 issues instructions for cartridge 2 to move from docking station 4 to vending machine main body 6 and to connect with vending machine main body 6. Upon connecting with vending machine main body 6, in S116, cartridge-vending machine main body verification processing is performed to verify that a suitable cartridge 2 is connected to the vending machine main body 6 and to acquire information such as the good name and storage conditions (not shown) suitable for that good (such as storage temperature and the like). For details of cartridge-vending machine main body verification processing, refer to FIG. 7.

When cartridge-vending machine main body verification processing is complete, in S118, shutter 26 of cartridge 2 is changed to the open state. Then, in S120, the goods are transferred from cartridge 2 to vending machine main body 6 to be dispensed to a user upon request.

Figure 6:
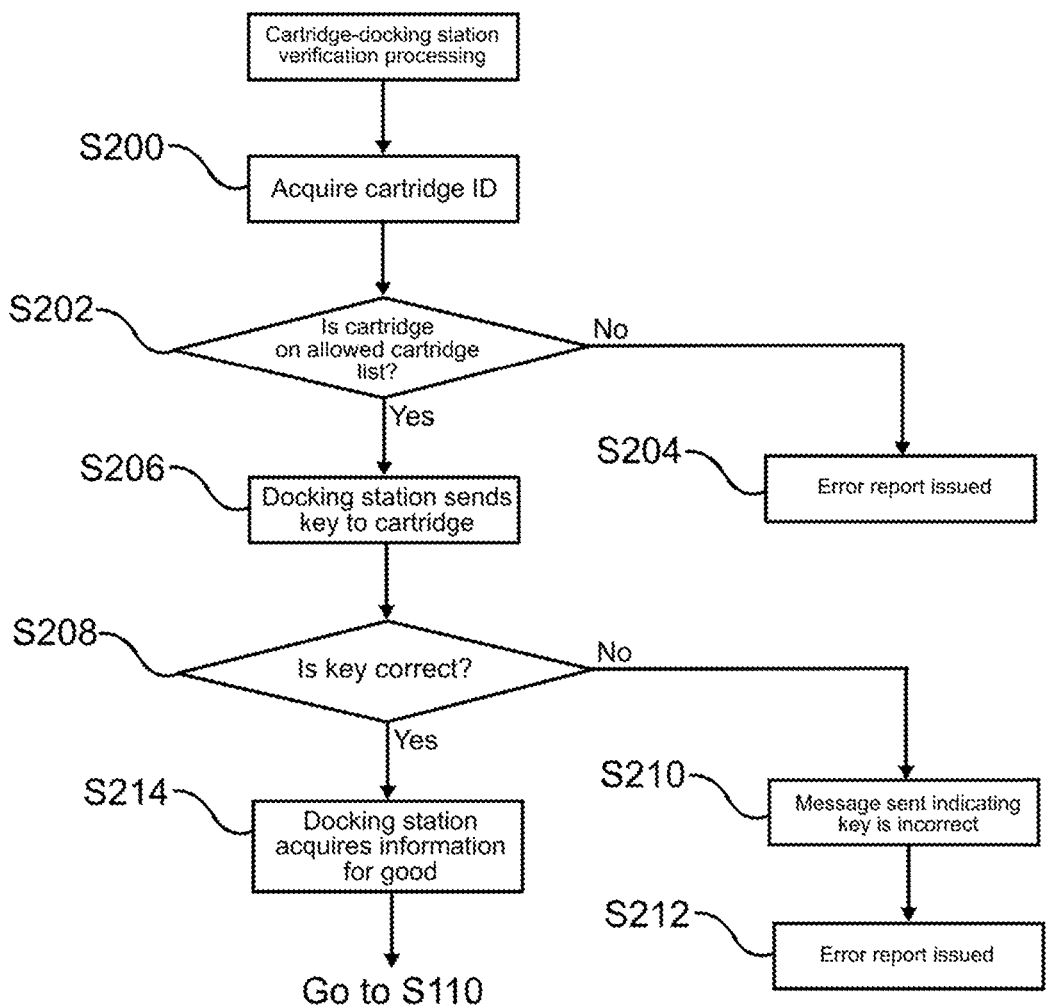
FIG. 6 shows an example of cartridge-docking station verification processing performed when a cartridge docks at a docking station, according to certain aspects of the disclosure.

FIG. 6 shows cartridge-docking station verification processing performed when a cartridge 2 docks at docking station 4 as described above. Upon docking at docking station 4, in S200, control circuitry 8 acquires the cartridge ID (cartridge identification information) of cartridge 2, for example, by reading and communication device 46 (ID reader) of docking station 4 receiving the cartridge ID from cartridge memory section 25 of cartridge 2. Next, in S202, processing is performed to determine whether the cartridge 2 matches a cartridge 2 on allowed cartridge list 903. If it is determined that the cartridge 2 does not match a cartridge 2 on allowed cartridge list 903, in S204, an error report is issued to a system administrator or the like.

On the other hand, if it is determined in S202 that the cartridge 2 matches a cartridge 2 on allowed cartridge list 903, in S206, docking station 4 sends the key set for cartridge 2 at factory 3 to the cartridge 2. In S208, it is determined whether the key sent by docking station 4 is the correct key for the cartridge 2. If it is determined that the key sent by docking station 4 is not the correct key for the cartridge 2, in S210, a message is sent to docking station 4 indicating that the key is not correct, such that docking station 4 ends processing. Then, in S212, an error report is issued to a system administrator or the like.

On the other hand, if it is determined in S208 that the key sent by docking station 4 is the correct key for the cartridge 2, processing proceeds to S214 and docking station 4 acquires information such as the good name and storage conditions (not shown) suitable for that good (such as storage temperature and the like). Then processing proceeds to S110 of FIG. 5.

Figure 7:
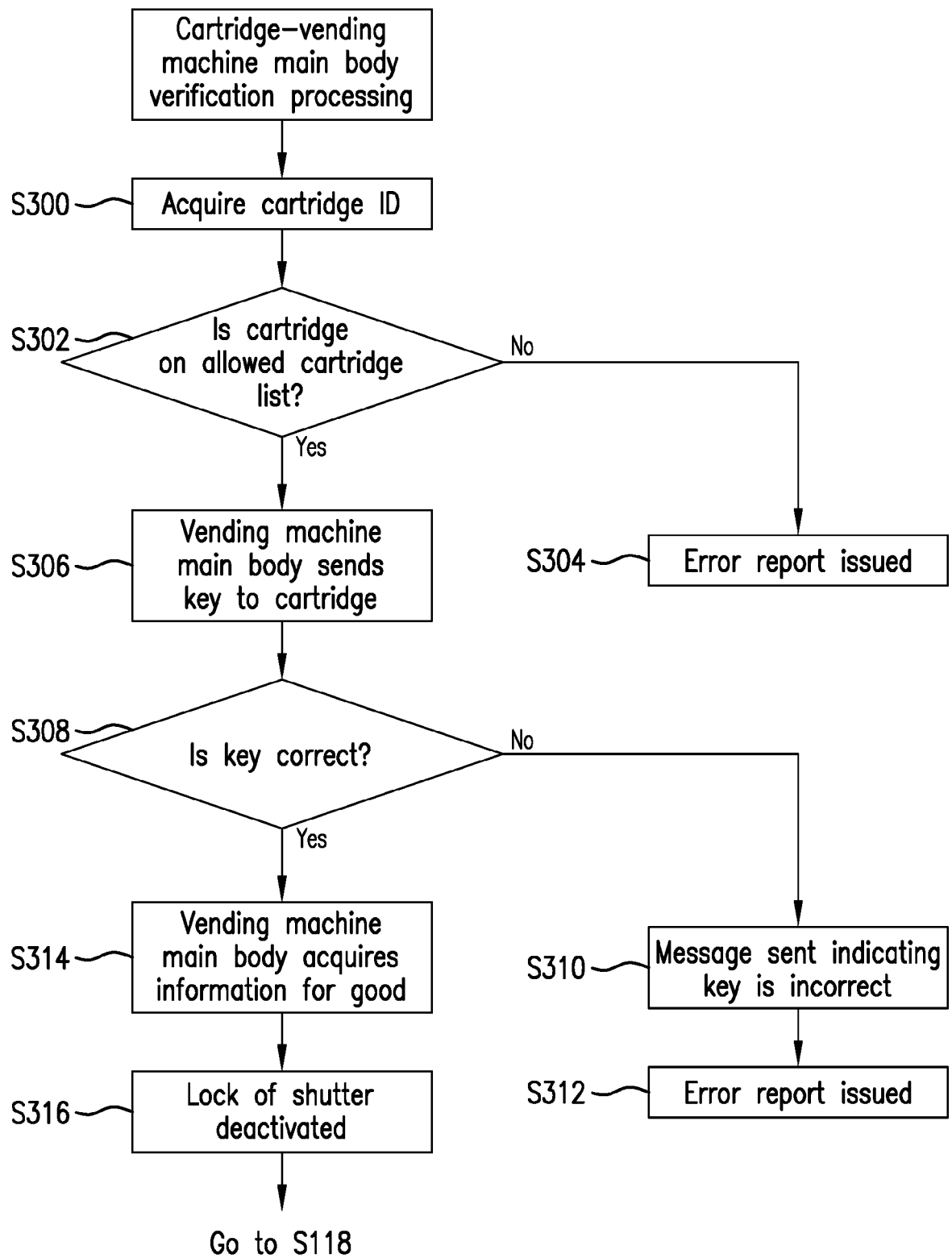
FIG. 7 shows an example of cartridge-vending machine main body verification processing performed when a cartridge loaded to a vending machine main body, according to certain aspects of the disclosure.

FIG. 7 shows cartridge-vending machine main body verification processing performed when a cartridge 2 is set at vending machine main body 6 as described above. Upon being set at vending machine main body 6, in S300, control circuitry 8 acquires the cartridge ID (cartridge identification information) of cartridge 2, for example, by reading and communication device 61 (ID reader) of vending machine main body 6 receiving the cartridge ID from cartridge memory section 25 of cartridge 2. Next, in S302, processing is performed to determine whether the cartridge 2 matches a cartridge 2 on allowed cartridge list 903. That is, vending control circuitry 63 of vending machine main body 6 compares the cartridge ID of the cartridge 2 to allowed cartridge list 903 memorized by control circuitry 8. If it is determined that the cartridge 2 does not match a cartridge 2 on allowed cartridge list 903, in S304, an error report is issued to a system administrator or the like.

On the other hand, if it is determined in S302 that the cartridge 2 matches a cartridge 2 on allowed cartridge list 903, in S306, vending machine main body 6 sends the key set for cartridge 2 at factory 3 to the cartridge 2. In S308, it is determined whether the key sent by vending machine main body 6 is the correct key for the cartridge 2. If it is determined that the key sent by vending machine main body 6 is not the correct key for the cartridge 2, in S310, a message is sent to vending machine main body 6 indicating that the key is not correct, such that vending machine main body 6 ends processing. Then, in S312, an error report is issued to a system administrator or the like.

On the other hand, if it is determined in S308 that the key sent by vending machine main body 6 is the correct key for the cartridge 2, processing proceeds to S314 and vending machine main body 6 acquires information such as the good name and storage conditions (not shown) suitable for that good (such as storage temperature and the like). Then, in S316, because the cartridge 2 loaded has been confirmed as a correct cartridge 2, lock 28 of shutter 26 is deactivated such that the goods in the cartridge 2 are allowed to be dispensed. In other words, vending control circuitry 63 of vending machine main body 6 is configured to compare the cartridge ID (cartridge identification information) read by reading and communication device 61 (ID reader) to allowed cartridge list 903 (list of allowed cartridge identification information memorized by control circuitry 8) and to only allow the good in the cartridge 2 to be dispensed if the cartridge ID (cartridge identification information) matches an item on the list of allowed cartridge identification information. After S316, processing proceeds to S118 of FIG. 5.

Figure 8:
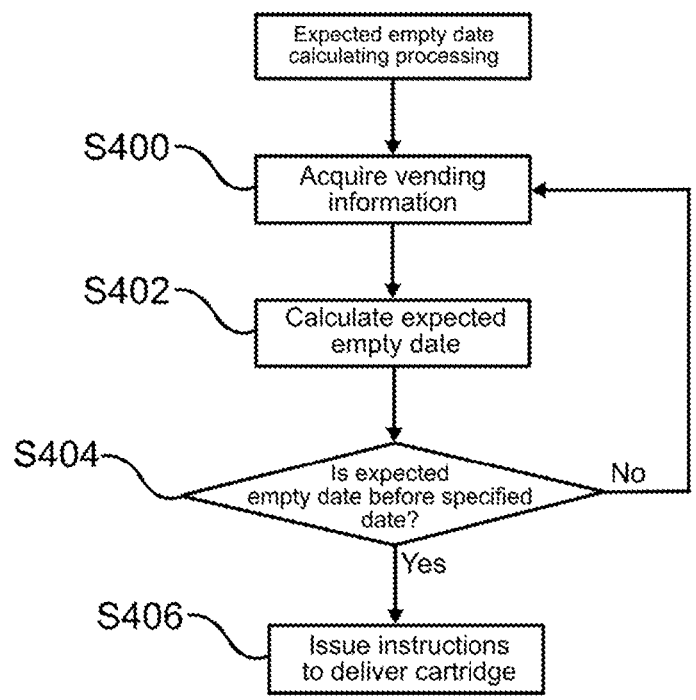
FIG. 8 shows an example of expected empty date calculating processing, according to certain aspects of the disclosure.

Described next with reference to FIG. 8 is expected empty date calculating processing. Control circuitry 8 is configured to memorize vending information 90 including location information of the vending machine main body 6, current position information of each of the multiple cartridges 2, good information of the type of the good held by each of the multiple cartridges 2, current quantity information that is the current quantity of the goods held by each of the cartridges 2, factory loading date information that is a date on which goods were loaded into each of the cartridges 2, dispensing date information that is a date on which each of the goods in each of the cartridges 2 were dispensed, vending machine quantity information that is information on a current quantity of the goods in the vending machine main body 6, docking station quantity information that is information on a current quantity of the goods in the cartridges 2 docked at docking station 4.

In S400 of FIG. 8, control circuitry 8 acquires vending information 90. Then, in S402, based on vending information 90, control circuitry 8 calculates an expected empty date at which modular vending machine system 1 will run out of the goods based on the vending information.

Next, in S404, control circuitry 8 compares the calculated expected empty date with a specified threshold date. If the expected empty date is before the specified threshold date, processing returns to S400. On the other hand, if the expected empty date is on or after the specified threshold date, processing proceeds to S406 and control circuitry 8 issues instructions to deliver cartridges 2 based on the expected empty date, that is, to deliver cartridges 2 loaded with suitable goods to a suitable location at which a modular vending machine system 1 is provided.

The foregoing discussion discloses and describes exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

Next, alternative example embodiments of modular vending machine system 1 are described.

In an embodiment above, as shown in FIG. 1, docking station 4 is provided near to vending machine main body 6, which facilitates movement of cartridge port 2 to and from docking station 4 and vending machine main body 6. However, it is not essential that docking station 4 is provided near to vending machine main body 6, so long as movement of cartridge 2 between the two is possible and communication can be performed between the various units. For example, to improve access for users to vending machine main body 6, docking station 4 may be provided in a store room or the like not accessible to users. In this manner, users are only obstructed when cartridges 2 are moving between docking station 4 and vending machine main body 6.

Figure 9:
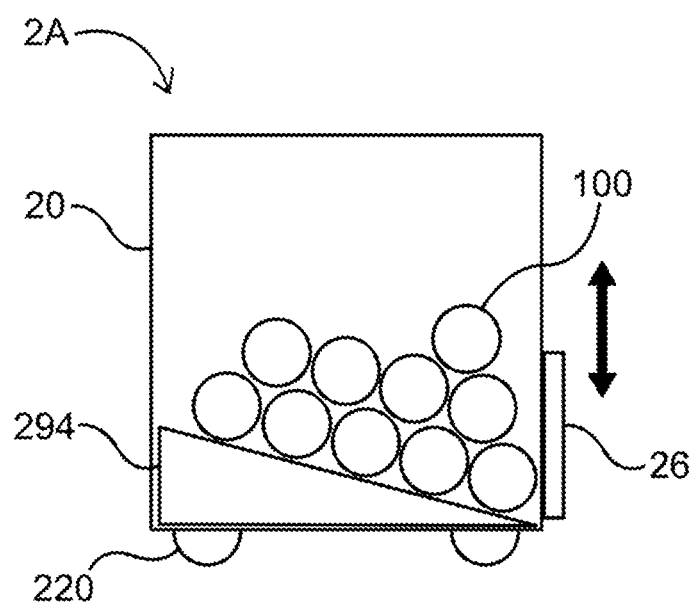
FIG. 9 shows an alternative embodiment of a cartridge, according to certain aspects of the disclosure.

FIG. 9 shows cartridge 2A, which is an alternative embodiment of a cartridge. Cartridge 2A is similar to cartridge 2 and is provided with body 20, shutter 26, wheels 220, and so on (other items are omitted from FIG. 9). Cartridge 2A is also provided with goods transferring mechanism 294. For example, in the embodiment shown in FIG. 9, goods transferring mechanism 294 is a slope provided such that when shutter 26 opens, goods 100 slide down the slope and into vending machine main body 6. The configuration of goods transferring mechanism 294 is not limited to a slope and may include active means for transferring goods such as a robot arm, pusher, conveyor belt, or the like. Providing goods transferring mechanism 294 on cartridge 2A enables the configuration of vending machine main body 6 to be simpler and less expensive.

In an embodiment above, cartridges are clamped to docking station 4 or vending machine main body 6 by a clamper on the docking station 4 or vending machine main body 6 clamping clamper receiving section 27 of cartridge 2. However, this configuration may be reversed such that the active portion of the clamping mechanism is on the cartridge and the clamped portion of the mechanism is on the docking station or vending machine main body. Alternatively, active clamping portions may be provided on both the cartridge and the docking station or vending machine main body.

In an embodiment above, movement of cartridges by traveling mechanism 22 of cartridge 2 is fully automated based on, for example, GPS, but movement of cartridges may be performed by an operator assisting cartridge 2 to move using traveling mechanism 22. For example, control circuitry 8 may issue instructions about moving a cartridge 2 to an operator via a paper printout or a display of a mobile terminal or the like.

In an embodiment above, control circuitry 8 issues instructions for the cartridge 2 currently loaded in cartridge port 62 of vending machine main body 6 to move from vending machine main body 6 to docking station 4 when goods to be dispensed run out at vending machine main body 6. However, the timing for issuing such instructions to cartridge 2 is not limited to this. For example, control circuitry 8 may issue instructions for the cartridge 2 currently loaded in cartridge port 62 to move from vending machine main body 6 to docking station 4 as soon as goods run out from cartridge 2 (or have been transferred from cartridge 2 to vending machine main body 6), or when the quantity of goods remaining in vending machine main body 6 has reached a specified level.

In an embodiment above, advertising surface 23 is an electronic display, but a removable film, sticker, or the like could be applied to the surface of the cartridges to act as an advertising surface. Similar effects are achieved with such a removable film, sticker, or the like as with an electronic display, while being simpler and less expensive.

In an embodiment above, an opening mechanism for opening shutter 26 of cartridge 2 is opening and closing arm 682 of robot 68. However, in an alternative embodiment, at least a portion of a mechanism opening shutter 26 may be provided on cartridge side, and the vending machine main body may be configured to send a signal to the cartridge to operate to open the shutter. In this manner, the configuration of the vending machine main body can be made simpler and less expensive.

In an embodiment above, vending information 90 is used, for example, to calculate an expected empty date such that new cartridges can be delivered in a timely manner. Vending information 90 may also be used to provide traceability information related to the goods dispensed. For example, because the dispensing date of each good is memorized in vending information 90, it is easier for a system administrator to keep track of where and when a certain good was dispensed (sold). This would be especially useful in the case, for example, of a product recall in which it was necessary to try and contact users who had purchased a particular good.

Main items of the disclosure and their benefits are summarized below.

Modular vending machine system 1 includes multiple cartridges configured to hold a good to be dispensed; a docking station configured to removably store at least one of the cartridges; a vending machine main body including a cartridge port configured to receive at least one of the cartridges, a dispensing-port for dispensing the good to a user, and a mechanism configured to perform at least one of removing the good from the cartridge, performing dispensing preparation processing of the good, or dispensing the good via the dispensing port; and control circuitry configured to control operation of the cartridges, the docking station, and the vending machine, wherein the cartridge is provided with a traveling mechanism configured to enable the cartridge to move to and from the docking station and the vending machine main body.

Because cartridge 2 is provided with traveling mechanism 22 configured to enable the cartridge 2 to move to and from docking station 4 and vending machine main body 6, work of restocking the vending machine main body 6 with goods is performed more efficiently. For example, when goods have been depleted in a first cartridge 2 set in cartridge port 62 the vending machine main body 6, traveling mechanism 22 of the first cartridge 2 enables the first cartridge 2 to move from vending machine main body 6 to docking station 4. Also, traveling mechanism 22 of a second cartridge 2 that is fully stocked with goods enables the second cartridge 2 to move from the docking station 4 to the vending machine main body 6. In this way, the vending machine main body is restocked with goods in a highly efficient manner.

Cartridge 2 may be configured to move automatically to and from docking station 4 and vending machine main body 6 based on signals issued from control circuitry 8. In this manner, restocking of goods can be performed in a highly secure and efficient manner. For example, vending machine main body 6 can be restocked at any time, not only when an operator is present.

Further, cartridge 2 may be provided with lockable shutter 26 movable between a closed state in which the good cannot be accessed from outside the cartridge and an open state in which the good can be removed from the cartridge, and vending machine main body 6 may be provided with a shutter opening mechanism (robot 68, shutter opening and closing arm 682) configured to change the lockable shutter 26 to and from the open state and the closed state. Accordingly, security of modular vending machine system 1 is improved while enabling goods to be transferred between cartridge 2 and vending machine main body 6 in an efficient manner.

Also, cartridge 2 may be provided with cartridge memory section 25 configured to memorize a cartridge ID (cartridge identification information) of the cartridge 2; the vending machine main body may be provided with reading and communication device 61 (ID reader) configured to read the cartridge ID (cartridge identification information) of the cartridge 2 when the cartridge 2 has moved to the vending machine main body 6 and vending control circuitry 63 configured to compare the cartridge ID (cartridge identification information) read by the reading and communication device 61 (ID reader) to allowed cartridge list 903 (a list of allowed cartridge identification information) memorized by control circuitry 8 and to only allow the good in the cartridge 2 to be dispensed if the cartridge ID (cartridge identification information) matches an item on the allowed cartridge list 903.

Thus, it is possible to ensure that only suitable goods are allowed to be dispensed by modular vending machine system 1 (vending machine main body 6).

Further, cartridge 2 may be provided with goods transferring mechanism 94 configured to transfer the goods from cartridge 2 to vending machine main body 6 when cartridge 2 has been moved to vending machine main body 6.

Accordingly, the configuration of vending machine main body 6 can be made simpler and less expensive.

Further, control circuitry 8 may be configured to memorize vending information 90 including location information of the vending machine main body, current position information of each of the multiple cartridges, good information of the type of the good held by each of the multiple cartridges, current quantity information that is the current quantity of the goods held by each of the cartridges, factory loading date information that is a date on which goods were loaded into each of the cartridges, dispensing date information that is a date on which each of the goods in each of the cartridges were dispensed, vending machine quantity information that is information on a current quantity of the goods in the vending machine main body, docking station quantity information that is information on a current quantity of the goods in the cartridges docked at the docking station, and the control circuitry may be further configured to calculate an expected empty date at which the modular vending machine system will run out of the goods based on the vending information, and to issue instructions to deliver cartridges 2 based on the expected empty date.

In this manner, it is possible to ensure that modular vending machine system 1 is always suitably stocked with goods.

REFERENCE SIGNS LIST

1: modular vending machine system; 100: good; 2: cartridge; 20: body; 21: temperature controller; 210: heating section; 212: cooling section; 22: traveling mechanism; 220: wheels; 222: motor; 224: locating device; 226: traveling control circuitry; 24: supply port; 25: cartridge memory section; 26: shutter; 27: clamper receiving section; 28: lock; 290: power and communication receiving connection; 292: amenities receiving connection; 294: goods transferring mechanism; 3: factory; 31: truck; 4: docking station; 40: damper; 42: power and communication connection; 44: amenities supply; 46: reading and communication device (ID reader); 48: temperature controller; 482: heating section; 484: cooling section; 49: advertising controller; 6: vending machine main body; 60: body; 62: cartridge port; 622: damper; 64: dispensing port; 66: user interface; 68: robot (mechanism, shutter opening mechanism); 682: shutter opening and closing arm (shutting opening mechanism); 684: good handling device; 686: motor; 61: reading and communication device (ID reader); 63: vending control circuitry; 8: control circuitry; 80: memory; 82: calculating section; 90: vending information; 901: cartridge information; 902: vending machine information; 903: allowed list information; 904: expected empty date

The invention claimed is:

1. A modular vending machine system comprising:
multiple cartridges configured to hold a good to be dispensed;
a docking station configured to removably store at least one of the cartridges;
a vending machine main body including
a cartridge port configured to receive at least one of the cartridges,
a dispensing-port for dispensing the good to a user, and
a mechanism configured to perform at least one of removing the good from the cartridge, performing dispensing preparation processing of the good, or dispensing the good via the dispensing port; and
control circuitry configured to control operation of the cartridges, the docking station, and the vending machine main body,
wherein the cartridge includes a traveling mechanism configured to move the cartridge to and from the docking station and the vending machine main body, the traveling mechanism including a motor and wheels driven by the motor to move the cartridge.

2. The modular vending machine system according to claim 1, wherein
the cartridge is configured to move with the traveling mechanism automatically to and from the docking station and the vending machine main body based on signals issued from the control circuitry.

3. The modular vending machine system according to claim 1, wherein
the multiple cartridges are provided with a lockable shutter movable between a closed state in which the good cannot be accessed from outside the cartridge and an open state in which the good can be removed from the cartridge, and
the vending machine main body is provided with a shutter opening mechanism configured to change the lockable shutter to and from the open state and the closed state.

4. The modular vending machine system according to claim 1, wherein
the cartridge is provided with a cartridge memory section configured to memorize cartridge identification information of the cartridge;
the vending machine main body is provided with
an ID reader configured to read the cartridge identification information of the cartridge when the cartridge has moved to the vending machine main body and
vending control circuitry configured to compare the cartridge identification information read by the ID reader to a list of allowed cartridge identification information memorized by the control circuitry and to only allow the good in the cartridge to be dispensed if the cartridge identification information matches an item on the list of allowed cartridge identification information.

5. The modular vending machine system according to claim 1, wherein
the cartridge is provided with a goods transferring mechanism configured to transfer the goods from the cartridge to the vending machine main body when the cartridge has been moved to the vending machine main body.

6. The modular vending machine system according to claim 1, wherein
the control circuitry is configured to memorize vending information of the modular vending machine system, and
the control circuitry is further configured to calculate an expected empty date at which the modular vending machine system will run out of the goods based on the vending information, and to issue instructions to deliver cartridges based on the expected empty date.

7. The modular vending machine system according to claim 6, wherein
the control circuitry includes location information of the vending machine main body, current position information of each of the multiple cartridges, good information of a type of the good held by each of the multiple cartridges, current quantity information that is the current quantity of the goods held by each of the cartridges, factory loading date information that is a date on which goods were loaded into each of the cartridges, dispensing date information that is a date on which each of the goods in each of the cartridges were dispensed, vending machine quantity information that is information on a current quantity of the goods in the vending machine main body, and docking station quantity information that is information on a current quantity of the goods in the cartridges docked at the docking station.

8. A modular vending machine method comprising:
loading a good to be dispensed into a cartridge that is one of multiple cartridges configured to hold the good, the cartridges being provided with a traveling mechanism, the traveling mechanism including a motor and wheels driven by the motor to move the cartridge, removably storing at least one of the cartridges at a docking station configured to removably store at least one of the cartridges;

receiving at least one of the cartridges into a cartridge port of a vending machine main body, the vending machine main body also including a dispensing-port for dispensing the good to a user and a mechanism configured to perform at least one of removing the good from the cartridge, performing dispensing preparation processing of the good, or dispensing the good via the dispensing port;

controlling operation of the cartridges, the docking station, and the vending machine main body using control circuitry;

and moving the cartridge to move to and from the docking station and the vending machine main body using the traveling mechanism.

* * * * *